United States Patent
Lantzsch

(10) Patent No.: US 9,958,334 B2
(45) Date of Patent: May 1, 2018

(54) HIGH TEMPERATURE SENSOR WITH A MOULDED PROTECTIVE TUBE

(71) Applicant: TESONA GmbH & Co. KG, Hörselberg-Hainich (DE)

(72) Inventor: Heiko Lantzsch, Eisenach (DE)

(73) Assignee: TESONA GmbH & Co., Hörselberg-Hainich (DE)

( * ) Notice: Subject to any disclaimer, the term of this patent is extended or adjusted under 35 U.S.C. 154(b) by 364 days.

(21) Appl. No.: 14/428,903

(22) PCT Filed: Sep. 16, 2013

(86) PCT No.: PCT/EP2013/069159
§ 371 (c)(1),
(2) Date: Mar. 17, 2015

(87) PCT Pub. No.: WO2014/041171
PCT Pub. Date: Mar. 20, 2014

(65) Prior Publication Data
US 2015/0247759 A1 Sep. 3, 2015

(30) Foreign Application Priority Data

Sep. 17, 2012 (DE) .................... 20 2012 103 539 U

(51) Int. Cl.
*G01K 1/08* (2006.01)
*G01K 13/02* (2006.01)

(52) U.S. Cl.
CPC .............. *G01K 1/08* (2013.01); *G01K 13/02* (2013.01); *G01K 2013/024* (2013.01); *G01K 2205/04* (2013.01); *Y10T 29/49808* (2015.01)

(58) Field of Classification Search
CPC ........................................................ G01K 1/08
See application file for complete search history.

(56) References Cited

U.S. PATENT DOCUMENTS

| 1,633,599 | A | | 6/1927 | Moeller | |
|---|---|---|---|---|---|
| 2,461,323 | A | * | 2/1949 | Hille | ...................... H05B 6/104 |
| | | | | | 219/153 |
| 5,071,258 | A | | 12/1991 | Usher et al. | |

(Continued)

FOREIGN PATENT DOCUMENTS

| DE | 4344174 | 7/1995 |
|---|---|---|
| DE | 102004010912 | 9/2005 |

(Continued)

OTHER PUBLICATIONS

PCT/EP2013/069153 International Search Report and Written Opinion dated May 26, 2014 (13 pages).

(Continued)

*Primary Examiner* — Minh Phan
*Assistant Examiner* — Leon W Rhodes, Jr.
(74) *Attorney, Agent, or Firm* — Michael Best & Friedrich LLP

(57) ABSTRACT

The invention relates to a method for producing a high temperature sensor, in particular a high temperature sensor for measuring the exhaust gas temperature of motor vehicles, comprising a sensor element and a protective tube which at least partially surrounds the sensor element. Said protective tube is closed on the hot side of the high temperature sensor by a shaping method, in particular molding.

16 Claims, 2 Drawing Sheets

(56) References Cited

U.S. PATENT DOCUMENTS

| | | | | |
|---|---|---|---|---|
| 5,449,234 A * | 9/1995 | Gipp | ............... | G01K 13/02 338/22 R |
| 5,753,835 A | 5/1998 | Gustin | | |
| 6,130,598 A | 10/2000 | Katsuki et al. | | |
| 7,665,890 B2 * | 2/2010 | Culbertson | ............ | G01K 7/023 374/100 |
| 7,982,580 B2 | 7/2011 | Weber et al. | | |
| 8,690,423 B2 * | 4/2014 | Alnaciash | ............. | G01K 13/02 374/144 |
| 2004/0101028 A1 | 5/2004 | Iwaya et al. | | |
| 2005/0038172 A1 | 2/2005 | Nimberger et al. | | |
| 2014/0355653 A1 * | 12/2014 | Heston | .............. | G01K 13/02 374/208 |

FOREIGN PATENT DOCUMENTS

| | | |
|---|---|---|
| DE | 102008060033 | 6/2010 |
| DE | 102011008177 | 7/2012 |
| EP | 2196787 | 6/2010 |
| EP | 2354770 | 8/2011 |
| GB | 2257794 | 1/1993 |
| JP | 55033689 A * | 3/1980 |
| JP | 2007187654 A * | 7/2007 |
| KR | 20120035548 | 4/2012 |
| WO | 2010063682 | 6/2010 |
| WO | 2011102810 | 8/2011 |

OTHER PUBLICATIONS

PCT/EP2013/069155 International Search Report and Written Opinion dated May 20, 2014 (14 pages).
PCT/EP2013/069157 International Search Report and Written Opinion dated Jun. 10, 2014 (15 pages).
PCT/EP2013/069158 International Search Report and Written Opinion dated May 26, 2014 (14 pages).
PCT/EP2013/069159 International Search Report and Written Opinion dated Jun. 2, 2014 (12 pages).

* cited by examiner

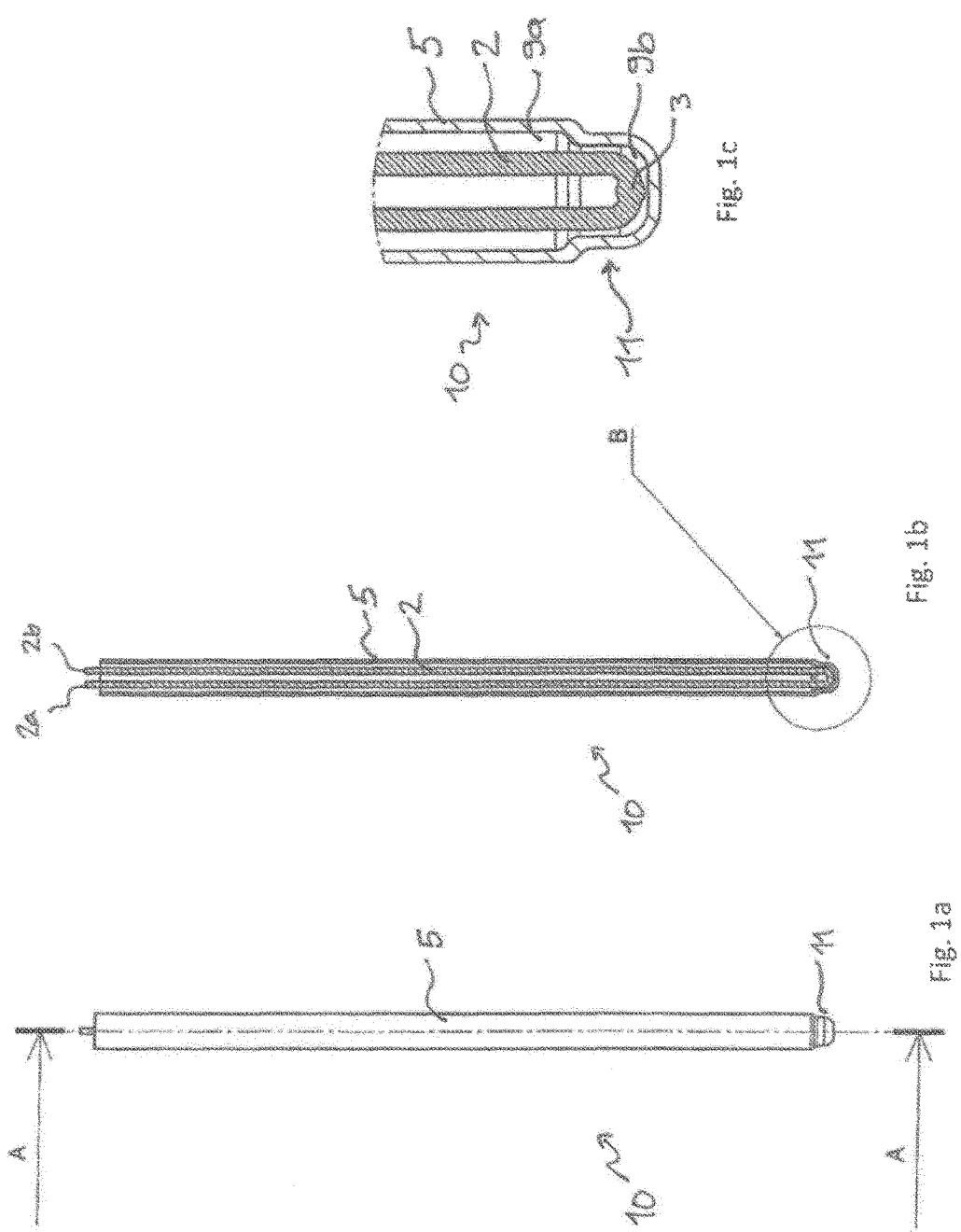

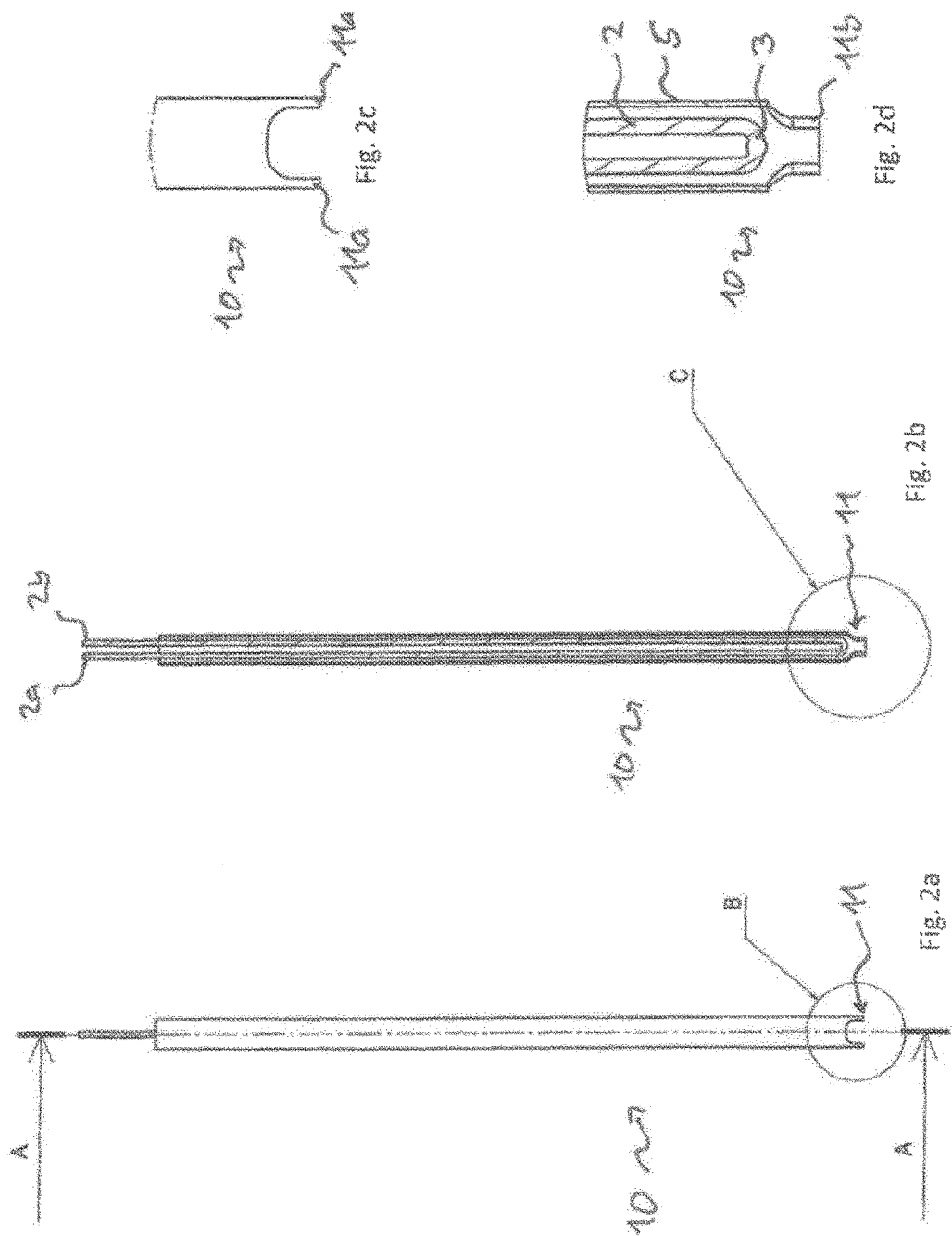

HIGH TEMPERATURE SENSOR WITH A MOULDED PROTECTIVE TUBE

CROSS REFERENCE TO RELATED APPLICATIONS

This application claims priority under 35 U.S.C. § 119 to PCT Application Number PCT/EP2013/069159 filed Sep. 16, 2013 and which claims priority to German patent document 20 2012 103 539.1, the entire contents of which are hereby incorporated by reference herein.

BACKGROUND

High-temperature sensors are used, for example, to measure the temperature in exhaust pipes of gasoline engines or in furnaces. They may be suited to measure temperatures of greater than 500° C. Especially when used in the automobile field, e.g. in exhaust gas cleaning systems, high-temperature sensors of this kind are exposed to high thermal and mechanical (due to the vibrations of the engine) loads. The sensor element for measuring the temperature is, therefore, typically protected by a protective envelope, in particular a protective tube, e.g. of metal.

In particular, high-temperature sensors of this kind may be designed as sheath thermocouples.

DE 10 2008 060 033 A1 discloses a temperature sensor having a thermocouple, which includes a sheathed fireproof cable including a sensor element attached to the cable end facing the sample medium and featuring electric connecting leads that run through a casing tube of the sheathed cable for connecting the sensor element to an electronic evaluation unit. It is proposed to provide a protective sleeve which comprises a one-piece front part, without any welding points. In addition, it is proposed to provide the protective sleeve with a curvature on its front side facing the sample medium.

WO 2010/063682 A1 discloses a temperature sensor having a thermocouple, which includes a sheathed fireproof cable including a sensor element attached to the cable end facing the sample medium. Electric connecting leads run through a metal tube of the sheathed cable for connecting the sensor element to an electronic evaluation unit. The disclosed temperature sensor is to be usable for temperatures up to 1200° C., and capable of sensing fast temperature changes. To this end, the sensor element consists of a thermo wire bead which protrudes from the sheathed cable and is received by a protective envelope that is attached to the end of the sheathed cable facing the sample medium. The protective envelope comprises a one-piece front part, without any welding points, and the sheathed cable is a flexible thin-walled metal tube with a small outer diameter, with the connecting leads running through the section thereof pointing away from the sample medium and creating the desired interface with an on-board electronic system. The attachment of the temperature sensor to the measuring point is realized by a special ring collar and a union nut.

A high-temperature sensor having a sensor element mounted in a protective tube is disclosed in EP 2 196 787 A2. To allow reliable measurements also in high-temperature environments, e.g. the exhaust gas system of a motor vehicle, the protective tube is surrounded by a reinforcement tube, the reinforcement tube is composed of material whose coefficient of thermal expansion is higher than that of the material from which the protective tube is formed. The reinforcement tube is fixedly connected to the protective tube in a first region of the protective tube, and an abutment element is also fixedly connected to the protective tube in a second region of the protective tube. The reinforcement tube, owing to its greater thermal expansion, comes into mechanical contact with the abutment element above a predefined temperature, whereby the high-temperature sensor is mechanically stabilized above this temperature. The space between the sensor element and the protective tube cap of EP 2 196 787 A2 is filled with a material having good heat-conducting properties. In this case, fine silicon powder may be used. The stabilizing mechanical contacting of the protective tube with the abutment element requires a minimum temperature, so that particularly directly in the starting phase, respectively, the non-high-performance operation the overall arrangement tends to vibrate which may put the reliability of the measuring arrangement at risk. The high-temperature sensor can be fixed in the exhaust gas system by means of a mounting pod.

SUMMARY

The present invention relates to a method for producing a high-temperature sensor, in particular a high-temperature sensor for measuring the exhaust gas temperature of motor vehicles, comprising a sensor element and a protective tube surrounding the sensor element at least partially.

The invention also relates to a high-temperature sensor, in particular a high-temperature sensor for measuring the exhaust gas temperature of motor vehicles, comprising a sensor element and a protective tube surrounding the sensor element at least partially.

It is an object of the invention to provide a further developed high-temperature sensor and a corresponding method for the production of such a high-temperature sensor, wherein the high-temperature sensor can be produced efficiently, and the sensor element is reliably protected against chemical and mechanical loads.

Accordingly, it is provided that the protective tube is closed on the hot side of the high-temperature sensor by a forming process, in particular by pressing.

A separate protective cap may be waived. Rather, the material of the protective tube itself serves as a closure.

In an embodiment of the invention it is provided that the forming process is carried out, at least partially, elastically. This means that when subjected to a partial elastic forming, the protective tube returns at least partially to the original shape.

In other embodiments the forming is carried out plastically so that the protective tube maintains the shape obtained during the forming process.

In another embodiment of the invention it is provided that the protective tube is pressed radially homogeneously.

Thus, the protective tube is formed rotationally symmetrically in the pressing region. In terms of manufacturing technology this can be implemented particularly easily and, furthermore, allows a particularly stable encapsulation of the protective tube.

In another embodiment of the invention it is provided that the protective tube is pressed from two sides such that the protective tube has two tips after the pressing.

In another embodiment of the invention it is provided that the protective tube is welded after the forming process.

The welding after the forming process results in an even closer encapsulation of the high-temperature sensor, so that the high-temperature sensor remains tightly closed even in the event of greater thermal or mechanical loads.

In another embodiment of the invention it is provided that the forming process effects a compaction of a material arranged in the protective tube.

The material arranged in the protective tube, in particular in the protective tube around the measuring section, may be a material having good heat-conducting properties, in particular a powdery material. The compaction thereof by the forming process, e.g. a plastic pressing of the protective tube, may result in an optimization of the heat-conducting properties.

In other embodiments of the invention the forming may also be partially plastically, meaning that the material arranged in the protective tube causes a certain recovery of the protective tube.

In another embodiment of the invention it is provided that the sensor element is not in contact with the protective tube.

In another embodiment of the invention it is provided that a filling material having good heat-conducting properties, in particular a ceramic powder, is arranged in the protective tube around the sensor element prior to the forming process.

The spacing allows a better protection of the mounted measuring section.

In another embodiment of the invention it is provided that the protective tube is thermally conditioned prior to, during or also after the punching.

In particular the material hardness or the material brittleness of the protective tube can be favorably influenced so that an improved pressing capability, i.e. ductility is obtained.

In another embodiment of the invention it is provided that the thermal conditioning is carried out by means of electromagnetic radiation, in particular by means of laser light and/or microwave radiation and/or inductive heating.

The beam intensity and beam shaping (beam thickness or cross-section of beam) of laser light, respectively, microwave radiation can be adapted to corresponding requirements so as to guarantee an improved conditioning. Moreover, it is possible to correspondingly adjust the laser also with respect to its beam characteristic in terms of time. Thus, for instance, pulsed, continuous or time-variable laser intensities are conceivable. Laser light is suited particularly well for the conditioning as the beam intensity thereof can be adjusted at such a high level that the protective tube can also be changed and influenced on an atomic level. According to further embodiments of the invention it is also possible to perform a mechanical conditioning in terms of a thermal conditioning along with a change of shape, meaning a thermal conditioning by changing the atomic bonds in the protective tube, thereby achieving a macroscopic change of shape.

A thermal conditioning may equally by achieved by warming up, heating or softening the material of the protective tube at least section-wise. A mechanical conditioning includes, in comparison, a thermal forming, respectively, deformation of the material at least section-wise and/or a thermal removal, respectively, evaporation of material. The conditioning may be applied to surface sections of the protective tube which are in contact with the pressing tool for the mechanical pressing thereof, or also to surface sections which are exposed during the pressing process.

In another embodiment of the invention it is provided that the conditioning is carried out by means of ultrasound.

In another embodiment of the invention it is provided that during and/or after the forming process an electric current flows through the protective tube and the thermal conditioning is realized by electrical resistance heating.

Electric current allows the exploitation of the electric conductivity. In particular, such a method may be used if the region of the protective tube to be pressed is made of a material which has another electric resistance than the rest of the protective tube. Thus, in the material having a lower resistance in the region to be pressed the power dissipation is higher, and a local heating exactly in the target region is obtained.

The invention will be explained in more detail below by means of exemplary embodiments and with the aid of figures.

BRIEF DESCRIPTION OF THE DRAWINGS

In the drawings:

FIG. 1a shows a lateral view of a first high-temperature sensor;

FIG. 1b shows a cross-sectional view of the high-temperature sensor of FIG. 1a;

FIG. 1c shows a detailed view of region B of FIG. 1b;

FIG. 2a shows a lateral view of a second high-temperature sensor;

FIG. 2b shows a cross-sectional view of the high-temperature sensor of FIG. 2a;

FIG. 2c shows a detailed view of region B of FIG. 2a; and

FIG. 2d shows a detailed view of region C of FIG. 2b.

DETAILED DESCRIPTION

FIG. 1a shows a high-temperature sensor 10 whose protective tube 5 was pressed radially homogeneously in a pressing section 11. The protective tube thus has a reduced diameter in pressing section 11. The tip of the high-temperature sensor 10 has, in this case, a flat design.

FIG. 1b shows a cross-sectional view of the high-temperature sensor 10 of FIG. 1a. The cutting plane extends along the sensor element 2. Electrical connections 2a; 2b are located at the cold end of the high-temperature sensor 10, the pressing section 11 is located at the hot end.

FIG. 1c shows a detailed view of region B of FIG. 1b. In particular, it can be seen that the sensor element 2 and the measuring section 3 thereof are not in contact with the protective tube 5, not even in the pressing section 11 in which the protective tube 5 has a reduced diameter.

During the pressing of the protective tube 5 the material 9b arranged around the measuring section 3 and having good heat-conducting properties was compacted, respectively, compressed in the pressing section 11, so that the heat conduction from the outside of the high-temperature sensor to the measuring section 3 is improved.

In the axial section of the protective tube 5, outside the pressing section 11, a filling material 9a is provided around the sensor element 2, which is different from the filling material 9b having good heat-conducting properties.

Another exemplary embodiment of a high-temperature sensor 10 according to the invention is shown in FIGS. 2a to 2d. The configuration thereof is substantially comparable with that of the high-temperature sensor shown in FIGS. 1a to 1c. In this embodiment the pressing is not carried out homogeneously radially, however, but inside the cutting plane illustrated in FIG. 2b. Thus, the reduction of the diameter of protective tube 5 in pressing section 11 is not uniform, but a laterally shaped contour of the pressing section 11 with two tips 11a and a constricted region 11b is formed. The thin tips made of the material of the protective tube, with good heat-conducting properties, allow a particularly good heat transfer to the measuring section 3.

What is claimed is:

1. A method for producing a high-temperature sensor (10) for measuring the exhaust gas temperature of motor vehicles, comprising a sensor element (2) and a protective tube (5) surrounding the sensor element (2) at least partially, wherein the protective tube (5) is closed on a hot side of the high-temperature sensor (10) by a pressing process and the protective tube (5) is pressed such that the protective tube (5) has two tip-shaped sections (11a) after the pressing, and wherein the two tip-shaped sections (11a) are thin tips projecting axially from a pressing section (11) and together defining a constricted region (11b) therebetween.

2. The method according to claim 1, characterized in that the pressing process is carried out, at least partially, elastically.

3. The method according to claim 2, characterized in that the the protective tube (5) is pressed such that the protective tube (5) has two tip-shaped sections (11a; 11b) after the pressing.

4. The method according to claim 2, characterized in that the pressing process realizes a compaction of a material arranged in the protective tube.

5. The method according to claim 1, characterized in that the pressing process is a pressing process and in that the protective tube (5) is pressed radially homogeneously.

6. The method according to claim 5, characterized in that the pressing process realizes a compaction of a material arranged in the protective tube.

7. The method according to claim 1, characterized in that the protective tube (5) is welded after the pressing process.

8. The method according to claim 7, characterized in that the pressing process realizes a compaction of a material arranged in the protective tube.

9. The method according to claim 1, characterized in that the pressing process realizes a compaction of a material arranged in the protective tube.

10. The method according to claim 1, characterized in that the sensor element (2) is not in contact with the protective tube (5).

11. The method according to claim 1, characterized in that a filling material (9b) containing boron nitride particles, is arranged in the protective tube (5) around the measuring section (3) of the sensor element prior to the pressing process.

12. The method according to claim 1, characterized in that the protective tube (5) is thermally conditioned during at least one of prior to, during, and after the pressing process.

13. The method according to claim 12, characterized in that the thermal conditioning is carried out by means of at least one of laser light, microwave radiation, and inductive heating.

14. The method according to claim 12, characterized in that the thermal conditioning is carried out by means of ultrasonic energy.

15. The method according to claim 12, characterized in that prior to and/or during the pressing process an electric current flows through the protective tube (5) and the thermal conditioning is realized by electrical resistance heating.

16. A high-temperature sensor (10), for measuring the exhaust gas temperature of motor vehicles, comprising:
 a sensor element (2); and
 a protective tube (5) surrounding the sensor element (2) at least partially, wherein the protective tube (5) is closed on a hot side of the high-temperature sensor by a pressing process, and the protective tube (5) is pressed such that the protective tube (5) has two tip-shaped sections (11a) after the pressing, and wherein the two tip-shaped sections (11a) are thin tips projecting axially from a pressing section (11) and together defining a constricted region (11b) therebetween.

* * * * *